United States Patent
Nakashima

(10) Patent No.: US 12,103,289 B2
(45) Date of Patent: Oct. 1, 2024

(54) MANUFACTURING METHOD OF ELECTRODE OUTER CASING

(71) Applicant: Prime Planet Energy & Solutions, Inc., Tokyo (JP)

(72) Inventor: Satoshi Nakashima, Toyota (JP)

(73) Assignee: PRIME PLANET ENERGY & SOLUTIONS, INC., Tokyo (JP)

(*) Notice: Subject to any disclaimer, the term of this patent is extended or adjusted under 35 U.S.C. 154(b) by 0 days.

(21) Appl. No.: 17/506,911

(22) Filed: Oct. 21, 2021

(65) Prior Publication Data

US 2022/0153011 A1    May 19, 2022

(30) Foreign Application Priority Data

Nov. 18, 2020    (JP) .................................. 2020-191494

(51) Int. Cl.
| | | |
|---|---|---|
| *B32B 37/10* | (2006.01) | |
| *B32B 41/00* | (2006.01) | |
| *H01M 4/04* | (2006.01) | |
| *B32B 38/00* | (2006.01) | |
| *H01G 11/84* | (2013.01) | |

(52) U.S. Cl.
CPC .............. *B32B 37/10* (2013.01); *B32B 41/00* (2013.01); *H01M 4/0435* (2013.01); *B32B 38/0004* (2013.01); *H01G 11/84* (2013.01)

(58) Field of Classification Search
CPC ........................... B32B 37/10; B32B 37/1054
See application file for complete search history.

(56) References Cited

U.S. PATENT DOCUMENTS

| | | | |
|---|---|---|---|
| 6,242,130 B1 | 6/2001 | Noh et al. | |
| 2015/0349375 A1* | 12/2015 | Takahashi | H01M 10/0436 |
| | | | 429/127 |
| 2017/0033326 A1 | 2/2017 | Goto et al. | |

FOREIGN PATENT DOCUMENTS

| | | | | |
|---|---|---|---|---|
| CN | 103183202 A | | 7/2013 | |
| CN | 106415877 A | | 2/2017 | |
| CN | 20853901 | * | 2/2019 | ............ H01M 10/04 |
| JP | H09-204915 | * | 8/1997 | ............. H01M 4/26 |
| JP | H10270059 A | | 10/1998 | |
| JP | 200058010 A | | 2/2000 | |
| JP | 2004-146252 | * | 5/2004 | ............. Y02E 60/10 |
| JP | 2004220908 A | | 8/2004 | |
| JP | 2005186136 A | | 7/2005 | |
| JP | 2005209665 | * | 8/2005 | ............. H01G 13/00 |
| JP | 200666113 A | | 3/2006 | |

(Continued)

*Primary Examiner* — Philip C Tucker
*Assistant Examiner* — John Blades
(74) *Attorney, Agent, or Firm* — HAUPTMAN HAM, LLP

(57) ABSTRACT

The present disclosure provides a manufacturing method of an electrode outer casing capable of improving a yield in a manufacturing method of an electrode outer casing which uses a laminated film and implementing an increase in productivity. The manufacturing method of an electrode outer casing disclosed herein includes a preparation step of preparing a multilayer laminated film which has at least a plurality of resin film layers, a transport step of transporting the laminated film to an unevenness forming section in order to form an uneven shape, a forming step of forming the laminated film in the unevenness forming section, and a cutting step of cutting the laminated film having been subjected to the forming step.

9 Claims, 5 Drawing Sheets

(56) References Cited

FOREIGN PATENT DOCUMENTS

| | | | | |
|---|---|---|---|---|
| JP | 2006196207 | * | 7/2006 | ............. H01M 2/18 |
| JP | 2009-037916 | * | 2/2009 | ............. H01M 8/02 |
| JP | 2013136437 | A | 7/2013 | |
| JP | 2015182235 | A | 10/2015 | |
| JP | 2016136508 | A | 7/2016 | |
| JP | 201733931 | A | 2/2017 | |
| JP | 2020-126730 | A | 8/2020 | |
| WO | 2015181666 | A1 | 12/2015 | |

* cited by examiner

MANUFACTURING METHOD OF ELECTRODE OUTER CASING

CROSS REFERENCE TO RELATED APPLICATIONS

The present application claims priority based on Japanese Patent Application No. 2020-191494 filed on Nov. 18, 2020, the entire contents of which are incorporated herein by reference in its entirety.

BACKGROUND OF THE DISCLOSURE

1. Technical Field

The present disclosure relates to a manufacturing method of an electrode outer casing which uses a laminated film.

2. Description of Background

In recent years, the importance of a secondary battery such as a lithium ion secondary battery which is used as a vehicle-mounted power source or a power source of a personal computer or a cellular phone has been increased. As one form of the secondary battery of this type, there is known a laminated battery in which an electrode body is accommodated in an electrode outer casing which uses a laminated film (hereinafter referred to as a laminated film outer casing).

In general, the laminated film outer casing is manufactured by forming a multilayer laminated film having metal foil for preventing entry of water into a battery, and a plurality of resin films. An example of a manufacturing method of the laminated film outer casing includes a manufacturing method in Japanese Patent Application Publication No. 2020-126730. Japanese Patent Application Publication No. 2020-126730 discloses the manufacturing method which performs so-called deep drawing in which a laminated film is held with a predetermined load by holding means, and is pressed from one direction by pressing means.

SUMMARY

However, in the above manufacturing method, the deep drawing is performed by using vertical movement which uses the holding means and the pressing means, and hence a yield in a forming step is low, and it is difficult to increase productivity. Consequently, a manufacturing method which improves the yield in the forming step and increases the productivity of the laminated film outer casing is in demand.

The present disclosure has been made in view of such circumstances, and a main object thereof is to provide a manufacturing method of an electrode outer casing which allows continuous forming of a laminated film outer casing and increases the productivity of the laminated film outer casing.

In order to attain the above object, a manufacturing method of an electrode outer casing including the following steps is provided. The manufacturing method disclosed herein is a manufacturing method of an electrode outer casing which accommodates an electrode body inside the electrode outer casing, and includes: a preparation step of preparing a multilayer laminated film which has at least a plurality of resin film layers; a transport step of transporting the laminated film to an unevenness forming section in order to form an uneven shape; a forming step of forming the laminated film by the unevenness forming section; and a cutting step of cutting the laminated film having been subjected to the forming step. Herein, the unevenness forming section includes a pair of convex and concave drums constituted by disposing a convex drum having a plurality of convex portions on an outer peripheral surface and a concave drum having a plurality of concave portions corresponding to the plurality of convex portions on an outer peripheral surface such that the convex drum and the concave drum face each other, and the laminated film is continuously formed by the unevenness forming section in the forming step.

In the manufacturing method, in the forming step, a pair of the convex drum and the concave drum rotate in synchronization with each other to form unevenness on the laminated film, and hence it is possible to implement continuous forming of a laminated film outer casing. With this, as compared with a conventional manufacturing method of a laminated film outer casing, a yield in the forming step is improved and productivity is significantly increased.

In a preferred aspect of the manufacturing method disclosed herein, the forming of the laminated film is performed on condition that a depth of a concave portion formed in the laminated film is not more than 15 mm in the forming step.

With this, it is possible to form the laminated film without damaging the laminated film, and reduce a forming defect.

In a preferred aspect of the manufacturing method disclosed herein, the laminated film is formed in a state in which both ends of the laminated film in a width direction orthogonal to a transport direction of the laminated film are held in the forming step.

With this, it is possible to perform unevenness forming in a state in which proper tension is applied to the laminated film. Consequently, the forming of the laminated film is facilitated, and it is possible to stably form a shape suitable as the laminated film outer casing.

In a preferred aspect of the manufacturing method disclosed herein, a plurality of the pairs of convex and concave drums are disposed in a transport direction of the laminated film, and the laminated film is formed by the plurality of the pairs of convex and concave drums such that a degree of unevenness of the laminated film is increased stepwise in the forming step.

With this, it is possible to stably form the concave portion while ensuring a given physical strength of the laminated film, and it is possible to manufacture the electrode outer casing having high quality.

In a preferred aspect of the manufacturing method disclosed herein, a plurality of the convex portions are arranged side by side in a width direction of the outer peripheral surface of the convex drum which is one of the pair of convex and concave drums in the unevenness forming section, and a plurality of the concave portions are arranged side by side so as to correspond to the plurality of the convex portions which are arranged side by side in a width direction of the outer peripheral surface of the concave drum which is another one of the pair of convex and concave drums.

With this, it becomes possible to manufacture a plurality of the laminated film outer casings simultaneously, and productivity is increased.

DETAILED DESCRIPTION

Hereinbelow, preferred embodiments of the present disclosure will be described with reference to the drawings. It will be easily understood that the embodiments described herein are not intended to limit the present disclosure. Note that, apart from matters which are specifically mentioned in the present specification, other matters which are necessary for implementation of the present disclosure (e.g., the typical manufacturing process of a manufacturing method of an electrode outer casing and the typical configuration of a non-aqueous electrolyte secondary battery which do not characterize the present disclosure) can be understood as design matters of those skilled in the art based on the conventional art in the field. The present disclosure can be implemented based on contents disclosed in the present specification and common general technical knowledge in the field. In addition, a symbol X in each drawing denotes a "width direction", a symbol Y denotes a "depth direction", and a symbol Z denotes a "height direction". Note that the dimensional relationship (length, width, thickness, and the like) may not necessarily reflect the actual dimensional relationship.

Herein, the configuration of a laminated battery will be described first, and a manufacturing apparatus and a manufacturing method of a laminated film outer casing according to an embodiment will be described next.

Note that, in the present specification, a "laminated battery" denotes batteries each having a configuration in which a laminated film is used as an outer casing and an electrode body is accommodated in the outer casing. The laminated battery may be, e.g., a storage battery (secondary battery) such as a lithium ion secondary battery or a nickel-metal hydride battery, and may also be a storage element (physical cell) such as an electrical double layer capacitor.

Laminated Battery

Figure 1:
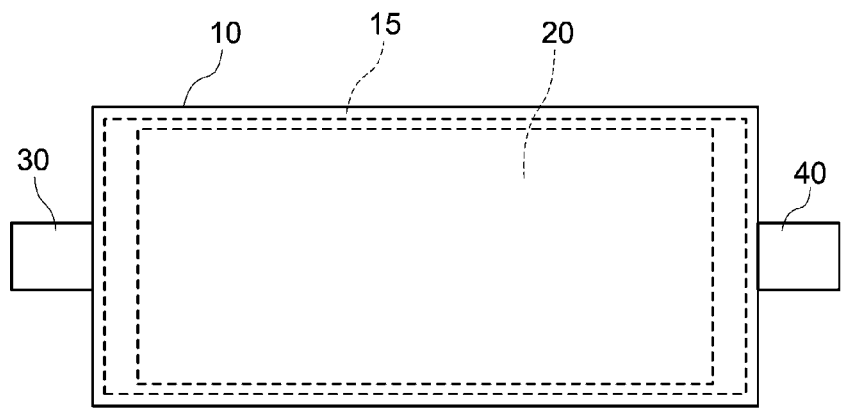
FIG. 1 is a plan view of a laminated battery according to an embodiment.

FIG. 1 is a schematic view of the laminated battery according to an embodiment. As shown in FIG. 1, a laminated battery 1 includes a laminated film outer casing 10 which serves as an outer casing, an electrode body 20 which is accommodated in the outer casing, and an electrolyte (not shown).

The laminated film outer casing 10 is manufactured by the manufacturing method of an electrode outer casing disclosed herein. The laminated film outer casing 10 is sealed by heat-sealing a peripheral edge portion 15 of accommodation space in which the electrode body 20 is accommodated. A positive electrode terminal 30 and a negative electrode terminal 40 protrude to the outside of the laminated film outer casing 10. The positive electrode terminal 30 and the negative electrode terminal 40 extend to the outside from the inside of the laminated film outer casing 10. The positive electrode terminal 30 and the negative electrode terminal 40 are external terminals.

The laminated film outer casing 10 is an insulating container which accommodates the electrode body 20. The configuration of the laminated film outer casing 10 may be identical to a conventionally known configuration, and is not particularly limited. The laminated film outer casing 10 is constituted by a multilayer laminated film which has at least a plurality of resin film layers. Typically, the structure of the laminated film can be a three-layer structure which has a metal layer and two resin film layers. For example, the laminated film outer casing 10 is constituted by stacking the resin film layer (weld portion), the metal layer, and the resin film layer (outer casing portion) from a side close to the electrode body 20.

The resin film layer (weld portion) is a layer for allowing heat sealing. The resin film layer (weld portion) is an innermost layer of the laminated film outer casing 10, i.e., the resin film layer is positioned on a side closest to the electrode body 20. The resin film layer (weld portion) is constituted by, e.g., a thermoplastic resin. Examples of the thermoplastic resin include a biaxially oriented polyester resin (polyethylene terephthalate), a biaxially oriented polyamide resin, polypropylene, polystyrene, and polyvinyl chloride.

The metal layer is a layer which blocks moisture and air outside the laminated battery 1 from coming inside, or gas generated inside the laminated battery 1 from going outside. The metal layer is constituted by a metal material such as, e.g., aluminum, iron, or stainless steel. Among them, from the viewpoint of cost and a reduction in weight, aluminum is preferable. The metal layer may also be, e.g., aluminum foil or an aluminum-evaporated layer.

The resin film layer (outer casing portion) is a layer for improving the durability of the laminated film outer casing 10. The resin film layer (outer casing portion) is positioned on a side closer to an outer surface than the metal layer. The resin film layer (outer casing portion) may also be an outermost layer of the laminated film outer casing 10. The resin film layer (outer casing portion) is constituted by, e.g., a non-oriented polyolefin resin (polypropylene) or polyethylene terephthalate.

Note that, with regard to the configuration of the laminated film outer casing 10, the case where the laminated film outer casing 10 has the three-layer structure having the resin film layer (weld portion), the metal layer, and the resin film layer (outer casing portion) has been described above, but the configuration of the laminated film outer casing 10 is not limited thereto. For example, the laminated film outer casing 10 may also have a multilayer structure having four or more layers. As an example, the laminated film outer casing 10 may include a bonding layer for bonding the above-described layers together between the layers. The bonding layer may be constituted by, e.g., a resin such as polyamide. In addition, as another example, the laminated film outer casing 10 may further include, e.g., a printing layer, a flame-retardant layer, or a surface protective layer on the resin film layer (outer casing portion) as an outermost layer.

The electrode body 20 includes at least a positive electrode and a negative electrode. In the case where the laminated battery 1 is a lithium ion secondary battery, the positive electrode has, e.g., a configuration in which a positive electrode active material layer is provided on a positive electrode current collector. As the positive electrode current collector, it is possible to use, e.g., aluminum foil or the like. As a positive electrode active material contained in the positive electrode active material layer, it is possible to use, e.g., a lithium transition metal oxide, a lithium transition metal phosphate compound, or the like. In addition, the negative electrode has, e.g., a configuration in which a negative electrode active material layer is provided on a negative electrode current collector. As the negative electrode current collector, it is possible to use, e.g., copper foil or the like. As a negative electrode active material contained in the negative electrode active material layer, it is possible to use, e.g., graphite or the like.

The laminated battery 1 includes an electrolyte (not shown) inside the laminated film outer casing 10.

In the case where the laminated battery 1 is a liquid battery, the laminated battery 1 can have a configuration in which the electrode body 20 in which the positive electrode, a separator, and the negative electrode are stacked in this order is accommodated together with an electrolyte solution in the laminated film outer casing 10.

In the case where the laminated battery 1 is a liquid lithium ion secondary battery, as the separator, it is possible to use, e.g., porous polyolefin sheet. As the electrolyte solution, it is possible to use, e.g., an electrolyte solution obtained by solving lithium salt such as $LiPF_6$ in a non-aqueous solvent such as carbonates.

In the case where the laminated battery 1 is an all-solid battery, the laminated battery 1 can have a configuration in which the electrode body 20 in which the positive electrode, a solid electrolyte, and the negative electrode are stacked in this order is accommodated in the laminated film outer casing 10.

In the case where the laminated battery 1 is an all-solid lithium ion secondary battery, as the solid electrolyte, it is possible to use, e.g., various compounds having lithium ion conductivity (e.g., amorphous sulfides, crystalline sulfides, amorphous oxides, crystalline oxides, crystalline oxynitrides, crystalline nitrides, and crystalline iodides).

Manufacturing Apparatus of Laminated Film Outer Casing

Figure 2:
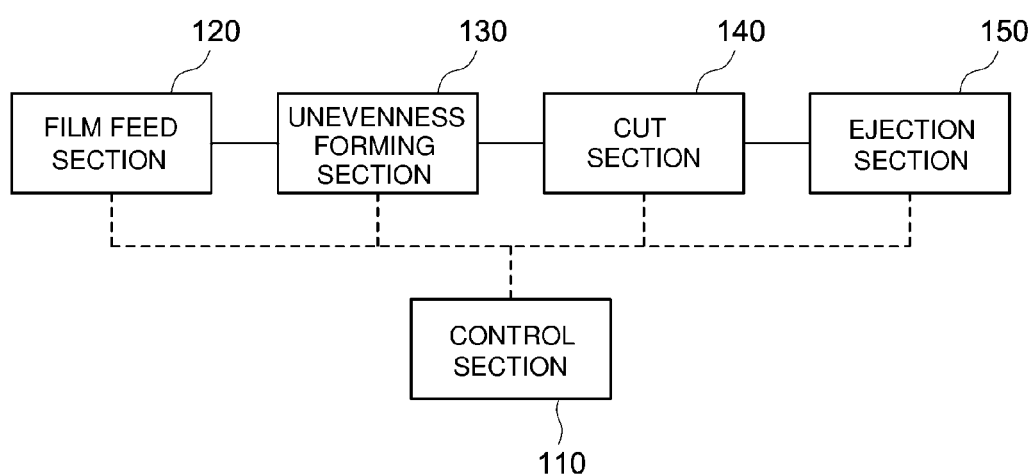
FIG. 2 is a block diagram schematically showing the rough configuration of a manufacturing apparatus of a laminated film outer casing according to an embodiment.
Figure 3:
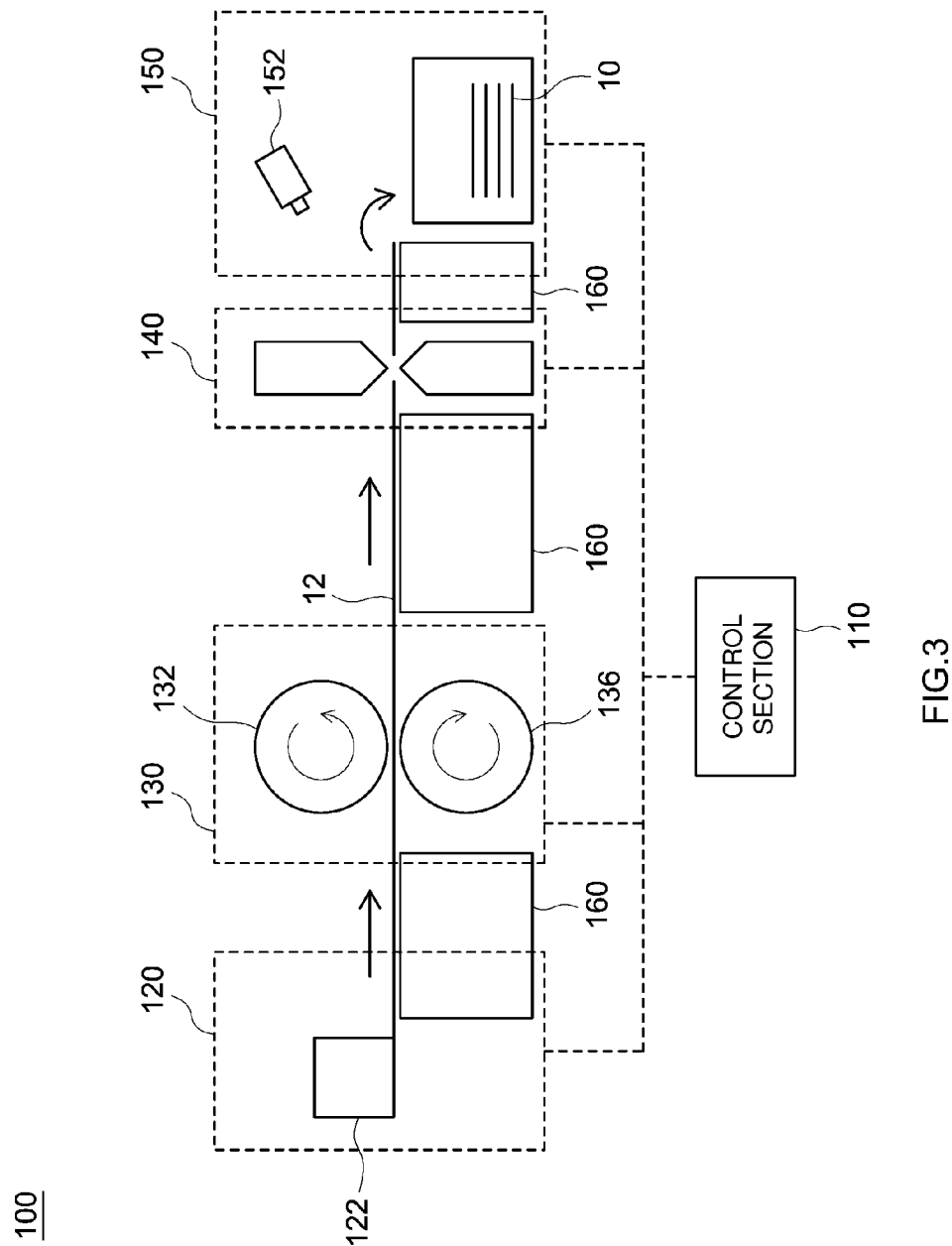
FIG. 3 is a view schematically showing the main configuration of the manufacturing apparatus of the laminated film outer casing according to the embodiment.

A manufacturing apparatus 100 used in the manufacturing method disclosed herein will be described with reference to the drawings. As shown in FIG. 2 and FIG. 3, the manufacturing apparatus 100 includes a control section 110, a film feed section 120, an unevenness forming section 130, a cut section 140, and an ejection section 150. In addition, as shown in FIG. 3, there are provided support sections 160 for suitably transporting the laminated film 12. The control section 110 is electrically connected to each of the film feed section 120, the unevenness forming section 130, the cut section 140, and the ejection section 150 to control each thereof. Hereinafter, each configuration will be described.

The control section 110 is constituted by, e.g., a microcomputer. The hardware configuration of the microcomputer is not particularly limited. The microcomputer includes, e.g., an interface which allows transmission and reception of data to and from external equipment, a central processing unit (CPU) which executes commands of a control program, a read only memory (ROM) which stores programs executed by the CPU, a random access memory (RAM) which is used as a working area into which programs are loaded, and a storage section such as a memory for storing the above programs and various pieces of data, though the hardware configuration of the microcomputer is not limited thereto.

The film feed section 120 includes a film feed apparatus 122. The film feed apparatus 122 feeds the laminated film 12 having the above configuration, and supplies the laminated film 12 to the unevenness forming section 130. The film feed apparatus 122 preferably has the function of automatically replacing the laminated film 12 with a new laminated film 12 when the laminated film 12 is used up (i.e., an automatic replacement function). In addition, the film feed apparatus 122 may include an accumulator (not shown). The accumulator is controlled by the control section 110. Note that each arrow shown in FIG. 3 and FIG. 4 indicates a transport direction, and the laminated film 12 fed from the film feed apparatus 122 is transported in the direction indicated by the arrow.

Note that the configuration of each of the apparatus and the control of the film feed section 120 may be identical to that of a conventional film feed section of this type and does not characterize the present disclosure, and hence a detailed description thereof will be omitted.

As shown in FIG. 3, the unevenness forming section 130 is constituted by a pair of cylindrical convex and concave drums 132 and 136. The convex drum 132 has a plurality of convex portions. The concave drum 136 has a plurality of concave portions corresponding to the plurality of convex portions. The pair of convex and concave drums 132 and 136 are controlled by the control section 110 so as to rotate in synchronization with each other. According to this configuration, the pair of convex and concave drums 132 and 136 allow continuous forming of the laminated film 12, and can implement an increase in the productivity of the electrode outer casing.

Note that the continuous forming denotes forming of the laminated film 12 without stopping the transport of the laminated film 12.

Figure 4:
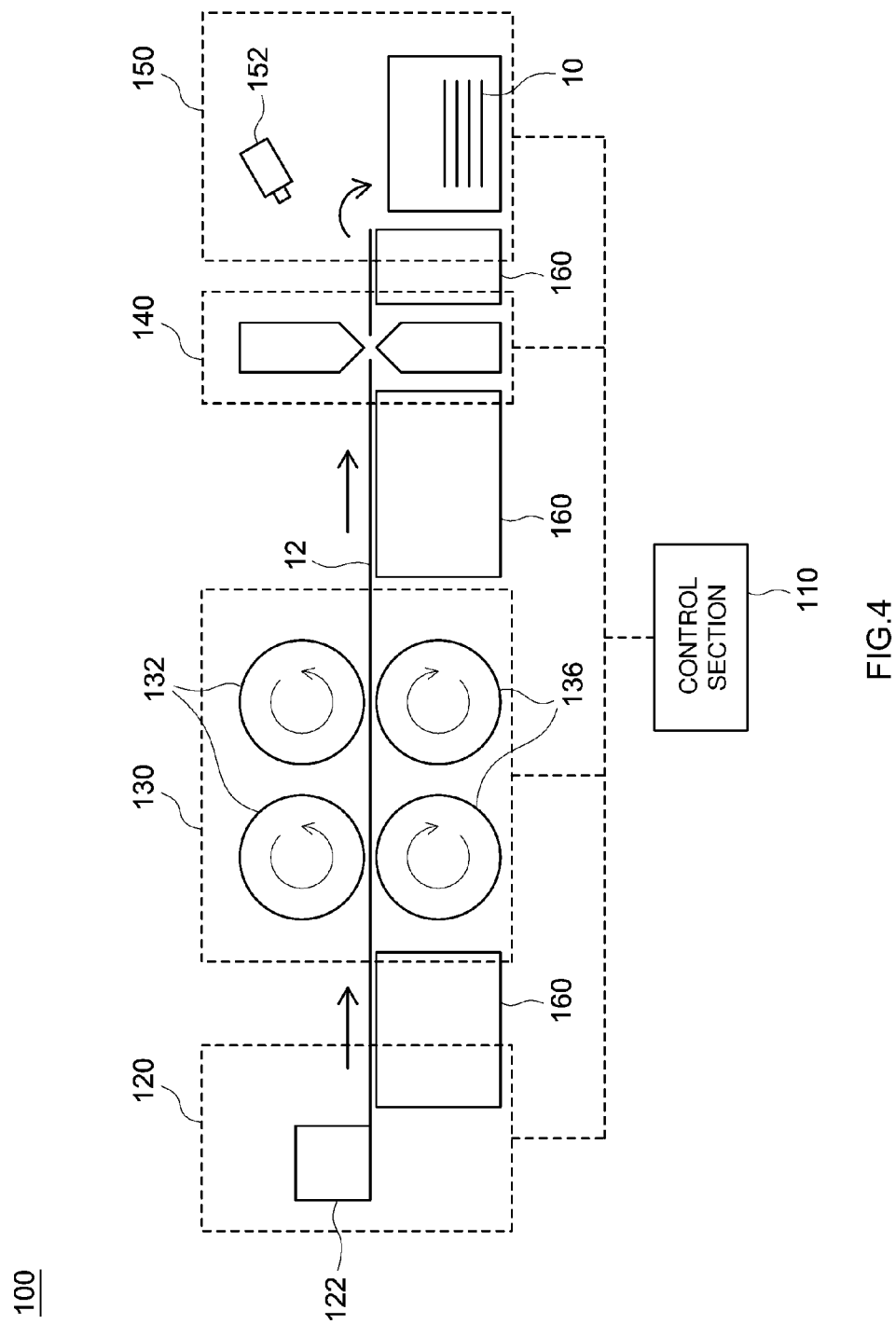
FIG. 4 is a view schematically showing the main configuration of the manufacturing apparatus of the laminated film outer casing according to another embodiment.

As shown in FIG. 4, the unevenness forming section 130 may include a plurality of the pairs of convex and concave drums 132 and 136. According to this configuration, it is possible to form the laminated film 12 such that the degree of unevenness of the laminated film 12 is increased stepwise. Note that, in an example shown in FIG. 4, while the unevenness forming section 130 is configured to have two pairs of convex and concave drums 132 and 136, the unevenness forming section 130 may have two or more pairs of convex and concave drums 132 and 136.

The cut section 140 includes a cutting machine or a punching machine for cutting or punching the laminated film 12 having been subjected to the forming into a predetermined size. As cut means, it is possible to use conventionally known cutting or punching methods such as a rotary cutter, a Tomson blade, and a laser cutter without particular limitation.

The ejection section 150 includes a transport path for transporting the laminated film outer casing 10 cut into the predetermined size to the outside. As ejection means, it is possible to use a configuration identical to that of conventional ejection means of this type without particular limitation. The ejection section 150 may include an inspection apparatus 152 capable of detecting a forming defective product. The inspection apparatus 152 is controlled by the control section 110. It is possible to provide, e.g., a marking function or an elimination mechanism such that the forming defective product is not transported to the transport path when the forming defective product is detected by the inspection apparatus 152.

Manufacturing Method of Laminated Film Outer Casing

The manufacturing method disclosed herein is characterized in that the laminated film 12 is continuously formed by the unevenness forming section 130 in which the convex drum 132 having the plurality of convex portions on an outer peripheral surface and the concave drum 136 having the plurality of concave portions corresponding to the plurality of convex portions on an outer peripheral surface are disposed so as to face each other. Hereinbelow, the manufacturing method will be described by using the drawings.

The manufacturing method disclosed herein includes the following four steps: (1) a preparation step of preparing the laminated film 12; (2) a transport step of transporting the laminated film 12 to the unevenness forming section 130 to form an uneven shape; (3) a forming step of forming the laminated film 12 by the unevenness forming section 130; and (4) a cutting step of cutting the laminated film 12 having been subjected to the forming in the cut section 140. Note that, in addition to these steps, other steps may be included in any stage. Hereinbelow, each step will be described.

(1) In the preparation step, the laminated film 12 having the above-described configuration is prepared. The laminated film 12 may be prepared by, e.g., purchasing a commercial item. The laminated film 12 can be typically a long rectangular flat sheet. The laminated film 12 may advance to the transport step in a state in which the laminated film 12 is a long sheet, and may also advance to the transport step after being cut into films each having desired dimensions in the preparation step.

(2) In the transport step, the laminated film 12 is transported to the unevenness forming section 130 in order to form the uneven shape on the prepared laminated film 12. Transport means is not particularly limited as long as the laminated film 12 fed from the film feed apparatus 122 is continuously supplied to the unevenness forming section 130. For example, the laminated film 12 may be transported by causing the convex drum 132 and the concave drum 136 to rotate in synchronization with each other, and the laminated film 12 may also be transported by a transport path (not shown) on a rotating transport roller (not shown).

Figure 5:
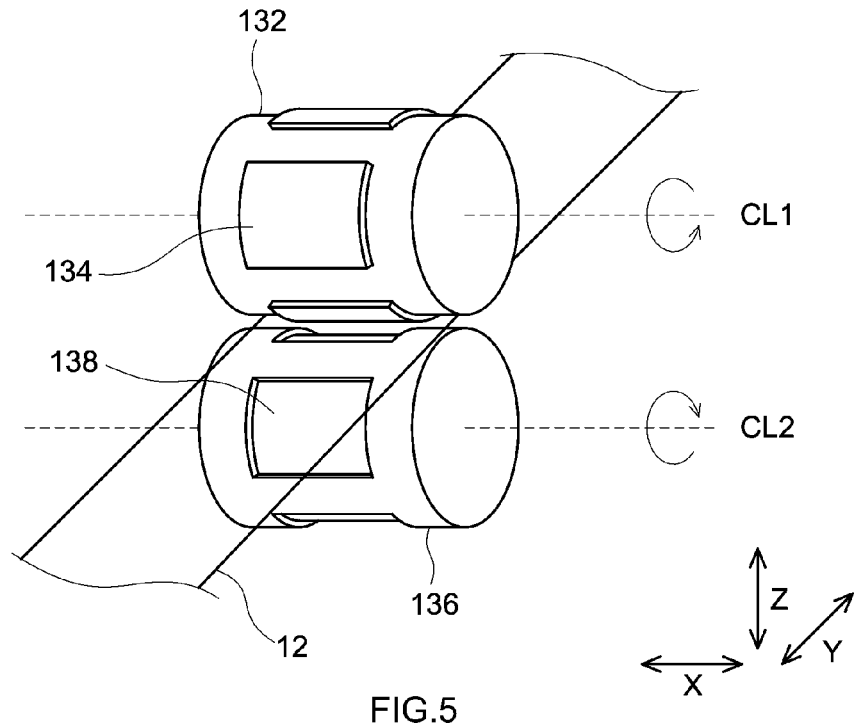
FIG. 5 is a perspective view schematically showing a pair of convex and concave drums provided in the manufacturing apparatus of the laminated film outer casing according to the embodiment.

(3) In the forming step, the laminated film 12 is continuously formed by the unevenness forming section 130. As shown in FIG. 5, the unevenness forming section 130 is constituted by the pair of convex and concave drums 132 and 136 constituted by disposing the convex drum 132 having the plurality of convex portions 134 on the outer peripheral surface, and the concave drum 136 having the plurality of concave portions 138 corresponding to the plurality of convex portions 134 on the outer peripheral surface such that the convex drum 132 and the concave drum 136 face each other. The pair of convex and concave drums 132 and 136 are disposed such that central axes CL1 and CL2 of the pair of convex and concave drums 132 and 136 are perpendicular to the pair of convex and concave drums 132 and 136. The diameter of each of the pair of convex and concave drums 132 and 136 is not particularly limited as long as the size of each of the pair of convex and concave drums 132 and 136 allows forming of a desired laminated film outer casing 10, and the diameter thereof is preferably, e.g., about 500 mm.

The uneven shape is formed on the laminated film 12 by causing the convex drum 132 and the concave drum 136 to rotate in synchronization with each other with the control section 110. Specifically, by causing the laminated film 12 to pass between the pair of convex and concave drums 132 and 136, the convex portion 134 and the concave portion 138 are pressed against the laminated film 12, and the uneven shape is formed.

In the above forming step, the rotation speed of the pair of convex and concave drums 132 and 136 is not particularly limited as long as the pair of convex and concave drums 132 and 136 rotate in synchronization with each other. The control section 110 can detect an angle of rotation (rotation angle) of the pair of convex and concave drums 132 and 136 per unit time with a monitor (not shown), and can adjust the rotation speed in accordance with the rotation angle when the pair of convex and concave drums 132 and 136 come in contact with the laminated film 12. For example, it is possible to reduce the rotation speed when the pair of convex and concave drums 132 and 136 come in contact with and move away from the laminated film 12. The pair of the convex drum 132 and the concave drum 136 rotate in opposite directions, as indicated by arrows in FIG. 5.

In the forming step, the depth of a concave portion formed in the laminated film 12 is not particularly limited as long as the laminated film 12 is not damaged. For example, the depth thereof is typically not more than 15 mm, preferably not more than 10 mm, and more preferably not more than 5 mm. The laminated film outer casing 10 having the above depth of the concave portion can suitably accommodate the above-described electrode body 20 and the electrolyte.

The unevenness forming by the pair of convex and concave drums 132 and 136 may be divided into a plurality of steps and performed. As shown in FIG. 4, the unevenness forming section 130 may include a plurality of the pairs of convex and concave drums 132 and 136 in the transport direction. For example, the convex and concave drums 132 and 136 are designed such that, as the laminated film 12 is transported in the transport direction, the depth of the concave portion 138 of the concave drum 136 is increased and the height of the convex portion 134 of the convex drum 132 is increased correspondingly to the increase in the depth thereof (i.e., the laminated film 12 is formed such that the degree of the unevenness of the laminated film 12 is increased stepwise). By performing the forming which is divided into a plurality of steps, it becomes possible to form the laminated film 12 such that the degree of the unevenness of the laminated film 12 is increased stepwise without damaging the laminated film 12. This stepwise forming can be implemented by causing a plurality of the pairs of convex and concave drums 132 and 136 to rotate in synchronization with each other with the control section 110. According to this configuration, it is possible to form the concave portion stably while ensuring a given physical strength of the laminated film 12.

The pair of convex and concave drums 132 and 136 rotate while holding the laminated film 12. The laminated film 12 is transported in a Y direction in a state in which the laminated film 12 is held and predetermined tension is thereby applied to the laminated film 12, and the uneven shape is formed. The predetermined tension is not particularly limited as long as the laminated film 12 is not damaged by the predetermined tension.

Figure 6:
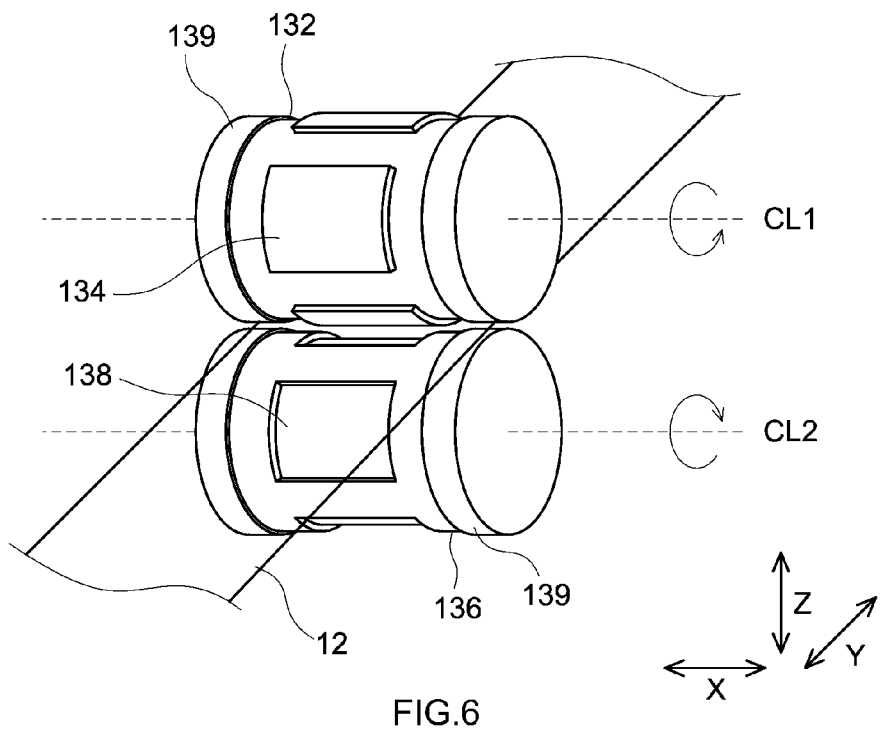
FIG. 6 is a perspective view schematically showing a pair of convex and concave drums provided in the manufacturing apparatus of the laminated film outer casing according to another embodiment.

As means for holding the laminated film 12, as shown in FIG. 6, cylindrical holding mechanisms 139 may be provided separately. Each holding mechanism 139 and the pair of convex and concave drums 132 and 136 rotate in synchronization with each other. The holding mechanism 139 is preferably designed such that the diameter of the holding mechanism 139 is slightly larger than that of each of the pair of convex and concave drums 132 and 136 in order to transport the laminated film 12 while suitably holding the laminated film 12. According to this configuration, it becomes possible to apply the predetermined tension to laminated film 12 more stably, and it is possible to form the laminated film 12 more easily.

It is possible to provide a tension control mechanism (not shown) between the film feed section 120 and the unevenness forming section 130 and perform the unevenness forming in a state in which the tension applied to the laminated film 12 is kept constant. An example of the tension control mechanism includes a dancer roll automatic tension control apparatus.

In order to prevent entry of air during forming of the laminated film 12, the pair of the convex drum 132 and the concave drum 136 may include an exhaust passage of air (not shown). According to this configuration, it is possible to reduce the entry of unnecessary air during the forming of the laminated film 12 and provide the laminated film outer casing 10 having higher quality.

Figure 7:
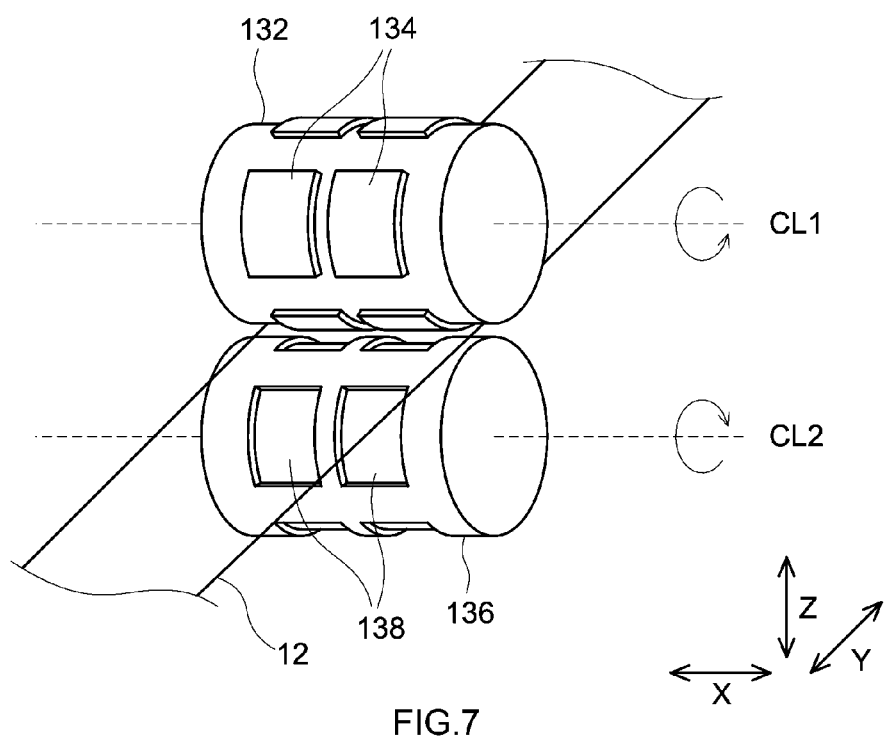
FIG. 7 is a perspective view schematically showing a pair of convex and concave drums provided in the manufacturing apparatus of the laminated film outer casing according to another embodiment.

In order to further increase the productivity of the forming step, as shown in FIG. 7, a plurality of the convex portions 134 and a plurality of the concave portions 138 may be arranged side by side in a width direction (X direction) of the drum. The plurality of the convex portions 134 arranged side by side may have the same shape or may also have different shapes. The plurality of the concave portions 138 arranged side by side may have the same shape or may also have different shapes. According to this configuration, it is possible to manufacture a plurality of the desired laminated film outer casings 10 simultaneously. In addition, in the case where the pair of convex and concave drums 132 and 136 in which two convex portions 134 are arranged side by side and two concave portions 138 are arranged side by side are used, the laminated film 12 is folded at a position which makes two formed concave portions line-symmetrical to each other, and the folded laminated film 12 can be used as one laminated film outer casing 10 (double cup). With this, the peripheral edge portion 15 of the laminated film outer casing 10 which is to be heat-sealed can have three sides, and hence it is possible to reduce production cost. Note that the case where the convex portions 134 and the concave portions 138 are arranged side by side in two lines on the outer peripheral surfaces of the drums has been described as an example in FIG. 7. However, the convex portions 134 and the concave portions 138 may also be arranged side by side in two or more lines on the outer peripheral surfaces of the drums.

From the viewpoint of facilitating the forming of the laminated film 12, the pair of convex and concave drums 132 and 136 may include a heating mechanism. With regard to the heating mechanism, heating means is not particularly limited as long as the heating means can heat the entire convex drum 132 and the entire concave drum 136 to a predetermined temperature uniformly. For example, the heating means may be provided in the pair of convex and concave drums 132 and 136. In addition, in the specific structure of the heating means, it is possible to use conventionally known heating means such and an IH heater without particular limitation. Note that heating temperature of the heating mechanism is preferably set in consideration of the thermal conductivity of the pair of convex and concave drums 132 and 136 and the heat-resistant temperature of the laminated film 12. The heating means of the heating mechanism is preferably set, e.g., so as to be able to heat the laminated film 12 in a range of not more than 70° C. via the pair of convex and concave drums 132 and 136.

As described above, in the case where the laminated film 12 is heated, a cooling mechanism may be provided before the transport from the forming step to the cutting step. With regard to the cooling mechanism, cooling means is not particularly limited as long as the cooling means can cool the heated laminated film 12 uniformly to a temperature before the laminated film 12 is heated. As the cooling means of the cooling mechanism, it is possible to use conventionally known coiling means such as, e.g., providing a refrigerant flow path through which a refrigerant (e.g., water) passes without particular limitation.

In the manufacturing method disclosed herein, a foreign object removal mechanism may be provided before the transport from the forming step to the cutting step. The foreign object removal mechanism can remove a foreign object generated during the unevenness forming such as metal. Foreign object removal means is not particularly limited, and the foreign object removal can be performed by a dust catcher or the like. By providing the foreign object removal means, it is possible to prevent inferior quality of the laminated film outer casing 10 caused by foreign object intrusion.

(4) The cutting step is a step of cutting the laminated film 12 formed in the forming step into a prescribed size. The size of the laminated film 12 is not particularly limited as long as the size thereof allows the above-described electrode body and the electrolyte to be accommodated.

According to the manufacturing method of the electrode outer casing disclosed herein, it is possible to improve a yield in the forming step and implement an increase in the productivity of the laminated film outer casing 10. In addition, the control section 110 performs proper control in each step, whereby it is possible to provide the high-quality laminated film outer casing 10 in which occurrence of a short circuit caused by a forming defect or foreign object intrusion is prevented.

While the specific examples of the present disclosure have been described in detail thus far, the specific examples are only illustrative, and are not intended to limit the scope of claims. The technique described in the scope of claims encompasses various modifications and changes to the specific examples described above.

What is claimed is:

1. A manufacturing method of an electrode outer casing which accommodates an electrode body inside the electrode outer casing, the manufacturing method comprising:
preparing a multilayer laminated film which has at least a plurality of resin film layers and a metal layer;
transporting the multilayer laminated film to an unevenness forming section to form an uneven shape, wherein the unevenness forming section forms the uneven shape having a depth for accommodating the electrode body;
forming the multilayer laminated film by the unevenness forming section; and
cutting the multilayer laminated film having been subjected to the forming, wherein
the unevenness forming section includes a pair of convex and concave drums constituted by disposing a convex drum having a plurality of convex portions on an outer peripheral surface of the convex drum and a concave drum having a plurality of concave portions corresponding to the plurality of convex portions on an outer peripheral surface of the concave drum such that the convex drum and the concave drum face each other,
the convex drum and the concave drum rotate synchronously in the forming, and
the multilayer laminated film is continuously formed by the unevenness forming section in the forming.

2. The manufacturing method according to claim 1, wherein the multilayer laminated film is formed in a state in which both ends of the multilayer laminated film in a width direction orthogonal to a transport direction of the multilayer laminated film are held in the forming.

3. The manufacturing method according to claim 1, wherein
the plurality of the convex portions are arranged side by side in a width direction of the outer peripheral surface of the convex drum, and the plurality of the concave portions are arranged side by side in a width direction of the outer peripheral surface of the concave drum so as to correspond to the plurality of the convex portions.

4. The manufacturing method according to claim 1, wherein
the convex drum has exactly four convex portions, and
the concave drum has exactly four concave portions.

5. The manufacturing method according to claim 1, wherein
the convex drum and the concave drum have a diameter of 500 mm.

6. The manufacturing method according to claim 1, wherein
the unevenness forming section forms the uneven shape including a concave portion having a depth of 5 mm to 15 mm on the multilayer laminated film.

7. The manufacturing method according to claim 1, wherein
the unevenness forming section includes a plurality of pairs of convex and concave drums.

8. The manufacturing method according to claim 7, wherein
in each of the plurality of pairs of convex and concave drums, the plurality of pairs of convex and concave drums is disposed in a transport direction of the multilayer laminated film, and
the multilayer laminated film is continuously formed by the plurality of pairs of convex and concave drums such that a degree of unevenness of the multilayer laminated film is increased stepwise.

9. The manufacturing method according to claim 1, wherein
in the forming, the electrode body is not included in the multilayer laminated film passing between the convex drum and the concave drum.

* * * * *